United States Patent

[11] 3,538,938

[72] Inventor Alexander S. Volpin
 Miami Beach, Florida
[21] Appl. No. 719,435
[22] Filed April 8, 1968
[45] Patented Nov. 10, 1970
[73] Assignee Harriet F. Kahn
 Executrix of said Alexander S. Volpin, deceased.

[54] AUTOMATIC SEALANT SEALED VALVES
 9 Claims, 11 Drawing Figs.
[52] U.S. Cl. .................................................. 137/246.2
[51] Int. Cl. .................................................... F16k 5/22
[50] Field of Search ........................................... 137/246.12, 246.11, 246.00, 246.22

[56] References Cited
UNITED STATES PATENTS

| | | | |
|---|---|---|---|
| 2,433,638 | 12/1947 | Volpin | 137/246.12 |
| 2,954,044 | 9/1960 | Volpin | 137/246.12 |
| 3,190,303 | 6/1965 | Volpin | 137/246.12 |
| 3,347,261 | 10/1967 | Yancey | 137/246.22 |

Primary Examiner—Clarence R. Gordon
Attorney—R. Werlin

ABSTRACT: An automatic sealant sealed valve having removable seat members adapted for installation in a cylindrical closure chamber, each seat member being provided with a sealant sealing system for sealing simultaneously in response to line pressure both between the seat member and the closure member and between the seat member and the surrounding wall of the closure chamber with sealant transmitted from a common sealant reservoir.

Patented Nov. 10, 1970 3,538,938

Alexander S. Volpin
INVENTOR.

BY

ATTORNEY

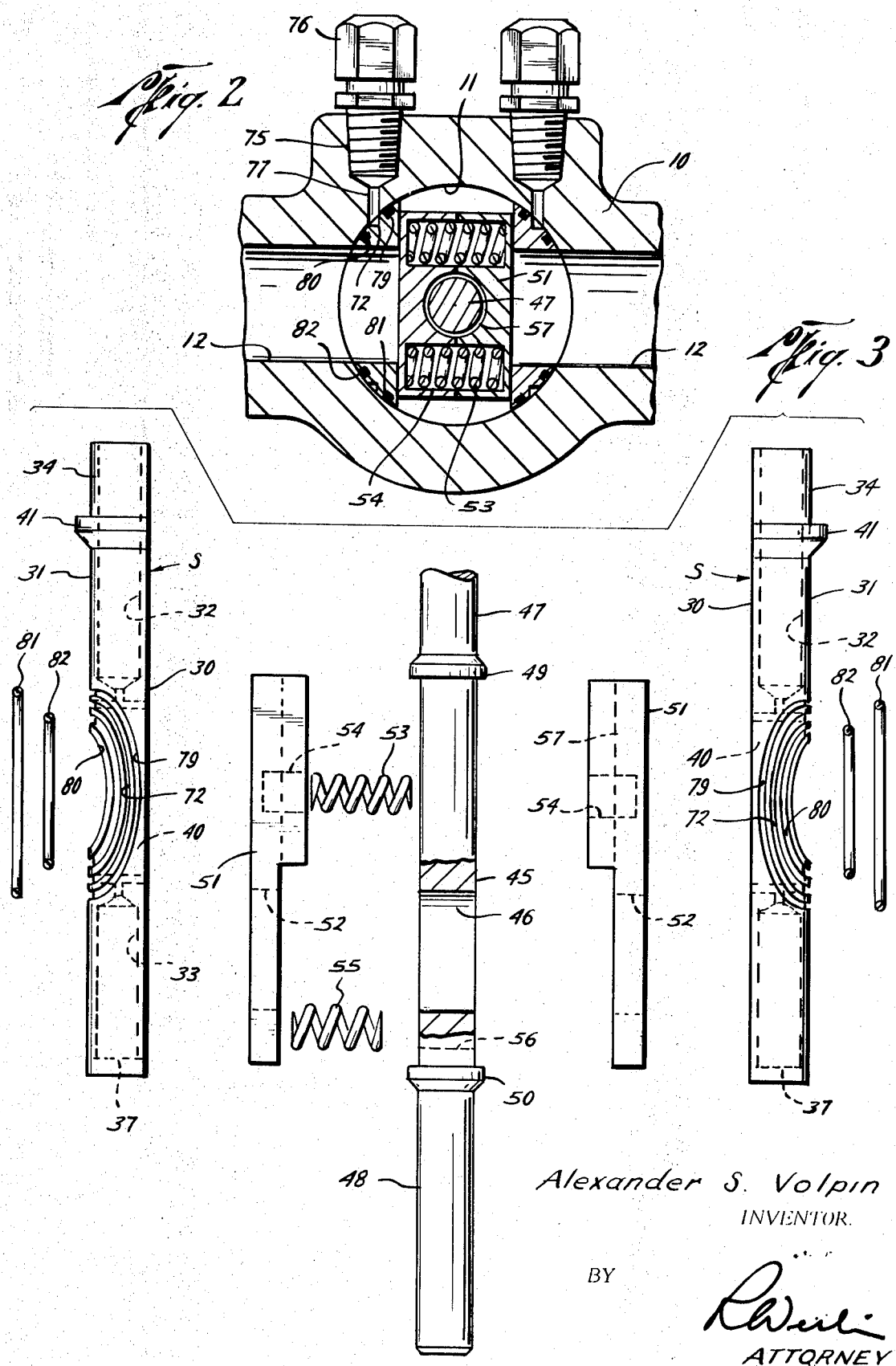

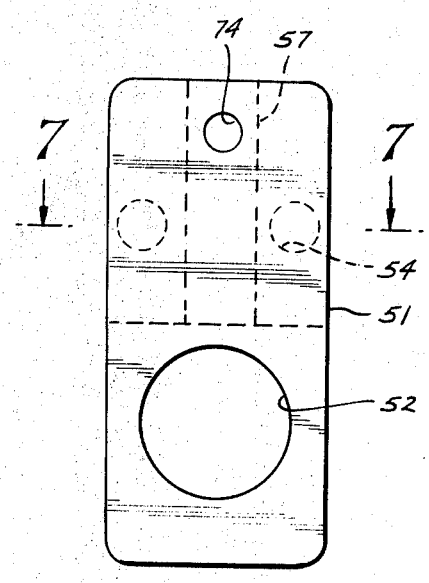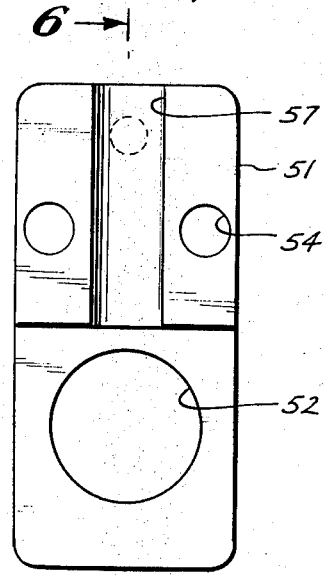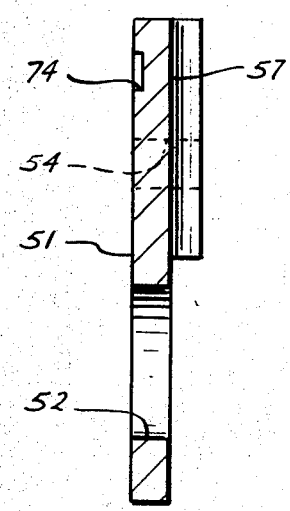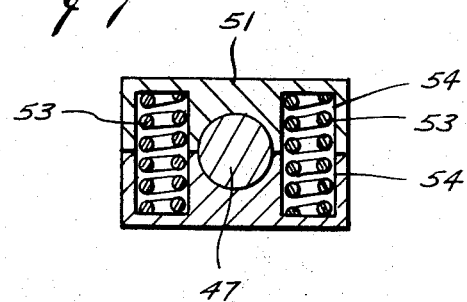

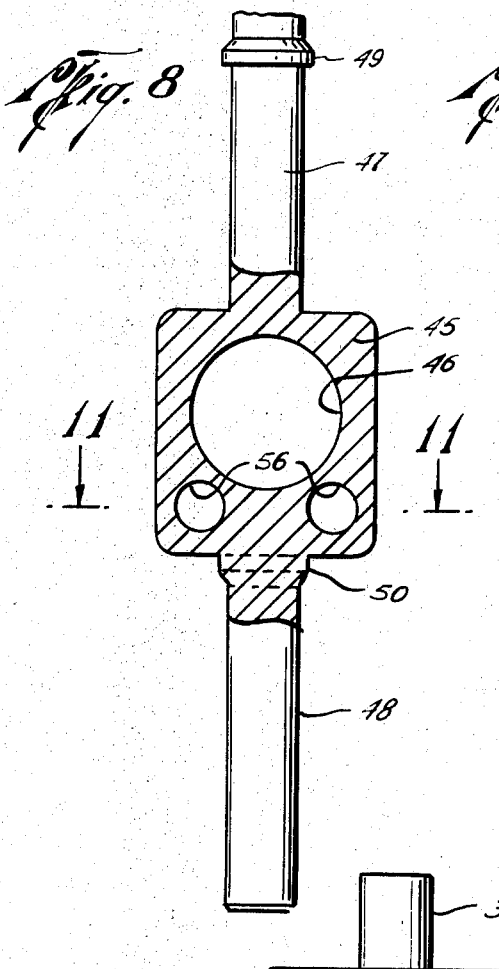
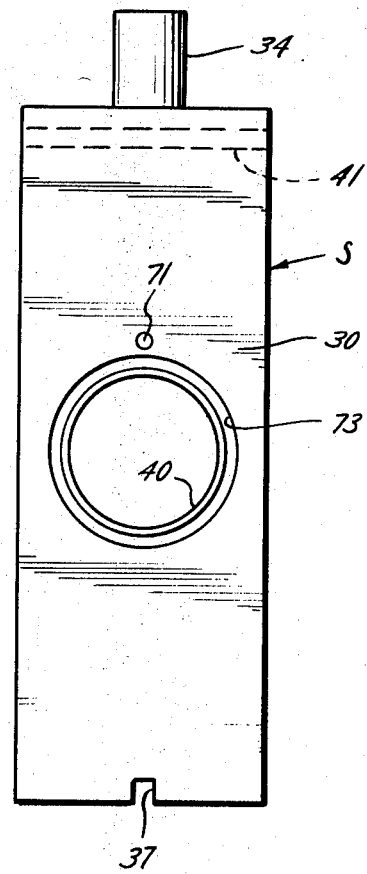
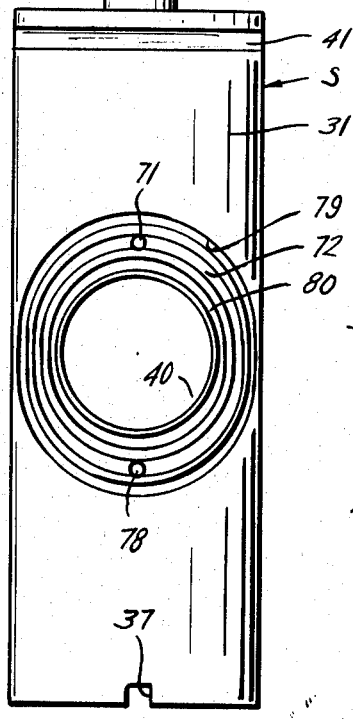
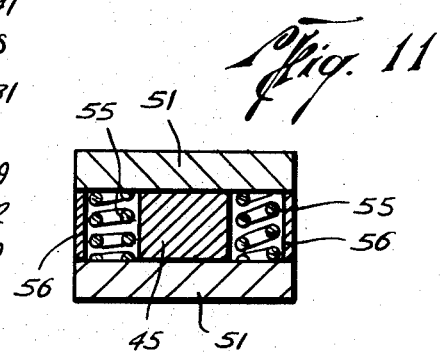

3,538,938

AUTOMATIC SEALANT SEALED VALVES

Valves of the automatic sealant sealed types have become widely used for many types of fluid handling systems. While generally successful, the incorporation of the automatic sealing systems necessarily involves constructions which are relatively complicated and more difficult to machine and assemble than other types of valves. This is particularly true in valves for controlling high pressure, well head valves, oil and gas pipe lines and the like. In such cases, the bulk and dimensions of the valves and the requirements for relatively intricate machining of the internal parts to accommodate the automatic sealing systems involve difficult and expensive operations to assure satisfactory leak-tightness and ease of operation under all conditions.

Also, modern oil well Christmas trees comprise unitary structures incorporating a plurality of valves which, in conventional designs, are difficult to repair or service in the field while the well remains in service.

The present invention, therefore, has for its primary object an improved construction for valves of the automatic sealant sealed type, particularly gate valves, which obviates such difficulties as those outlined above in more conventional constructions, and which additionally reduces sealant loss in operation and provides greater ease of operation than in earlier designs.

In accordance with a preferred embodiment of this invention, the valve includes a housing provided with a generally cylindrical closure chamber intersecting a flow way defined by coaxial opposed flow ports. A pair of seat members having transverse openings are removably mounted on opposite sides of the closure chamber with the openings in register with the respective flow ports. The outer face of each seat member defines a cylindrical segment adapted to complement the adjacent wall portion of the closure chamber and the inner faces of the seat members are shaped for sealing engagement with the opposite sides of a closure member movable between the seat members between positions opening and closing the flow way. In the exemplary embodiment the closure member is in the form of a flat-sided gate so that the inner faces of the seat member will be generally correspondingly flat.

Each seat member is provided with at least one sealant reservoir which may be incorporated in the seat member and connects a sealant conduit leading to the sealing area on the inner face of the seat member about the inner end of the transverse opening therein and additional conduit means communicating with a sealant groove disposed on the outer face of the seat member about the outer end of the opening. The reservoir is provided with a movable barrier responsive to line pressure when the closure member is in the flow way closing position to force sealant simultaneously through both conduits to the sealing area on the inner face and the sealing groove on the outer face of the downstream seat member. The latter is provided with concentric annular seals on both sides of the sealant groove to seal between the outer face of the seat member and the wall of the closure chamber about the opening through the seat member on both sides of the sealant groove.

Moreover, by the seat construction herein described, the seat members, designed to fit snugly against the walls of the closure chamber, may be easily inserted and removed from the closure chamber, and it is thus possible to eliminate the additional machining and assembly operations required in more conventional designs which usually involve providing counterbores in the inner ends of the flow ports for reception of more conventional seat constructions.

By incorporating the sealant reservoir, the sealant grooves and the interconnecting conduits all in the removable seat members, in accordance with the exemplary embodiment, the more intricate machining and forming operations are largely confined to the seat members, and other than a relatively simple cylindrical bore, or other bore of a regular shape, in the valve housing to form the closure chamber, comparatively little additional machining will be required for the valve housing, thereby greatly simplifying the manufacture and assembly of valves in accordance with this invention.

The provision of the sealant groove on the outer faces of the seat element provides a seal between the seat and the wall of the closure chamber, and the further provision of annular seal elements concentric with the sealant groove on opposite sides thereof assures against loss of sealant from the sealant groove irrespective of the direction of line pressure differential across the sealant groove. Also, this arrangement for sealing on both sides of the sealant groove, will protect against leakage which might otherwise occur due to temperature, pressure and line strain distortions which frequently occur, or by reason of corrosion or erosion between the surfaces of the seat members and the opposed wall of the closure chamber.

An additional important feature of this invention illustrated in the exemplary embodiment, resides in the provision, as the closure member, of a gate construction, having a flat-sided, through-conduit portion secured to oppositely extending stem sections of identical cross section to provide a balanced construction, the closure portion of the gate being formed by flat segments removably positioned about one of the stem sections and overlying the side faces of the conduit portion. The segments have openings registering with the through-conduit opening, and are resiliently urged apart to have maintained engagement with the inner faces of the seat members.

Other and more specific objects and advantages of this invention will become more readily apparent from the following detailed description when read in conjunction with the accompanying drawing which illustrates a useful and exemplary embodiment in accordance with this invention.

In the drawing:

FIG. 2 is a transverse cross-sectional view taken generally along line 2–2 of FIG. 1;

FIG. 3 is an exploded view in side elevation of the gate and seat elements;

FIGS. 4 and 5 are rear and front elevations, respectively, of one of the gate segments forming the closure portion of the gate;

FIG. 6 is a longitudinal sectional view taken on line 6–6 of FIG. 5;

FIG. 7 is a cross-sectional view taken along line 7–7 of FIG. 4;

FIG. 8 is an elevational, partly sectional view of the through-conduit portion of the gate and its oppositely extending stem sections;

FIGS. 9 and 10 are, respectively, front and rear elevational views of one of the seat members; and FIG. 11 is a cross-sectional view taken along line 11–11 of FIG. 8.

Figure 1:
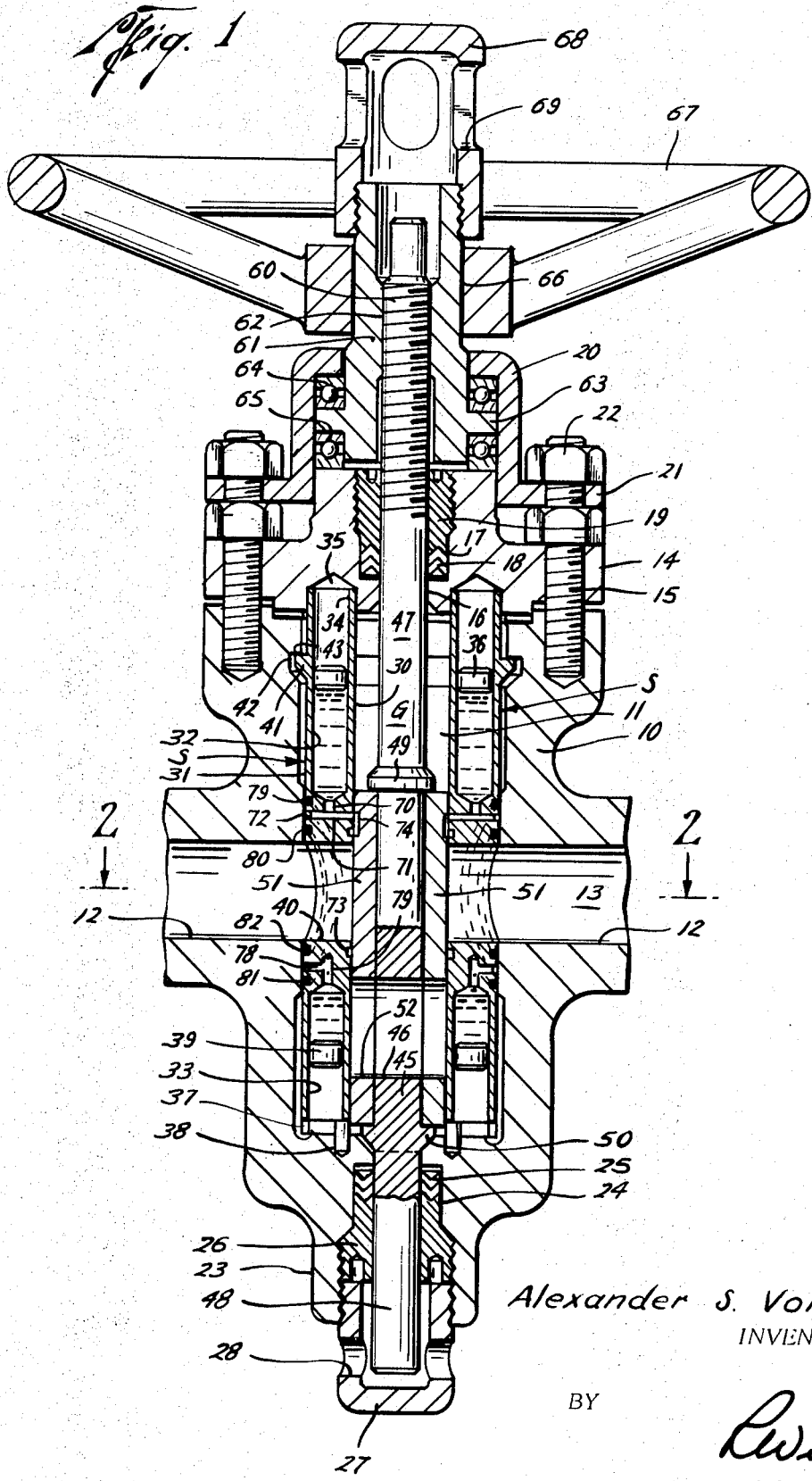
FIG. 1 is a vertical cross-sectional view of a gate valve embodiment in accordance with this invention, the closure member being shown in the flow way closing position.

Referring to the drawing, the valve includes a housing or body 10 enclosing a closure chamber 11 which, in the illustrative embodiment, is generally cylindrical, as seen in FIG. 2. Chamber 11 intersects coaxial flow ports 12,12, either of which may be the inlet or outlet, depending upon the orientation of the valve in the line in which it is mounted, and defining a flow way 13 through the housing. The upper end of chamber 11 is closed by a bonnet 14 secured to the upper end of body 10 by means of studs 15. Bonnet 14 is provided with a stem-receiving bore 16 having a counter bore forming a stuffing box 17 adapted to receive annular packing 18 for sealing about a stem and a gland 19 threadedly inserted into the upper end of counter-bore 17. The upper end of bonnet 14 is covered by means of a cap 20 which has a flange 21 for attachment to the upper ends of studs 15 by means of nuts 22.

The lower end of valve housing 10 is provided with a downwardly projecting tubular boss 23 counterbored from its outer end to form the stuffing box 24 for receiving a portion of the operating stem, as will be subsequently described, and adapted to receive annular packing 25 under compression by a gland 26 threadedly received in boss 23 and additionally held in place by a tubular cap 27 having transverse openings 28 therein.

Closure chamber 11 is adapted to receive a pair of seat members, each designated generally by the letter S. As these are identical in form and construction the description will be directed to only one of them, it being understood that the description will be equally applicable to the other.

The seat member is elongate in form, having an inwardly facing surface 30 shaped to cooperate with the abutting face of a closure assembly G, as will be described hereinafter, and an outwardly facing surface 31 shaped to be substantially complementary to the shape of the portion of the wall of chamber 11 surrounding the flow ports and extending longitudinally of the chamber. In the illustrative embodiment where closure assembly G is a gate of the flat-sided form, inner surface 30 will likewise be flat, while outer surface 31 of the seat member will be defined by a cylindrical segment substantially complementary to the shape of chamber 11.

The upper and lower end portions of the seat member are bored from their outer ends to provide reservoirs 32 and 33, respectively, adapted for reception of flowable sealant, such as is conventionally used in automatic sealant sealed valves. The upper end of reservoir 32 projects above the upper end of the main portion of the seat member in the form of a short cylindrical extension 34, which is receivable in a recess 35 and of generally complementary shape formed in the lower end of bonnet 14. Space is provided between the wall of chamber 11 and bonnet recess 35 to provide line pressure communication between the interior of the chamber and the open upper end of reservoir 32. A cylindrical piston or barrier 36 is slidably mounted in reservoir 32 for pressurizing sealant, as will be subsequently described. The lower end of the seat member containing reservoir 33 is provided with a transverse notch 37 for guiding the seat member into place against the wall of the closure chamber over a dowel pin 38 mounted in the lower end of chamber 11. space is also provided between the wall of chamber 11 and outer surface of the seat member to provide line pressure communication between the chamber and the open lower end of reservoir 33. The latter is also provided with a slidable piston or barrier 39 for urging sealant out of the reservoir, as will appear subsequently. In the portion between the reservoirs the seat member is provided with a transverse opening 40 coaxial with and of substantially equal diameter to flow port 12. Near its upper end the seat member is provided on rearward surface 31 with an outwardly projecting arcuate shoulder 41 adapted to be received in a correspondingly shaped groove 42 formed in the wall of chamber 11. The upper wall 43 defining groove 42 forms a downwardly facing shoulder abuttable by shoulder 41 to anchor the seat member in the chamber, and in cooperation with slot 37 and pin 38, to assure alignment of opening 40 with port 12 and of the several sealant passages which will be described hereinafter.

Returning now to the closure assembly G, shown in greater detail in FIGS. 3 to 8, inclusive, it will be seen that this comprises a flat-sided, generally rectangular through-conduit portion 45 having a transverse opening 46 therethrough, constituting the usual through-conduit passage which when aligned with flow way 13, will be coaxial therewith and of substantially flush diameter. Integrally connected with the ends of portion 45 are oppositely extending, coaxially aligned, cylindrical upper and lower stem sections 47 and 48, respectively, of substantially equal cross section. Upper and lower annular enlargements 49 and 50, respectively, are formed in spaced-apart relation above and below rectangular portion 45. Upper enlargement 49 is spaced above the upper end of portion 45 while lower enlargement 50 is formed immediately adjacent to the lower end of portion 45.

A pair of flat, generally rectangular closure segments 51,51, identical in shape and construction, are mounted on opposite sides of portion 45 between enlargements 49 and 50, the opposite ends of the segments abutting the related enlargements, as best seen in FIG. 1. As segments 51,51 are identical, the following description thereof will be limited to one of the segments. The segment is provided with a transverse opening 52 which is in registration with and of the same dimensions as opening 46. Thus, the openings 52 and 46, together, define the through-conduit opening through the closure member. The portion of segment 51 extending above rectangular portion 45 has a semicylindrical recess 57 in its inner face extending longitudinally in the center thereof adapted to receive approximately one-half of the cylindrical portion of upper stem 47, which extends between portion 45 and enlargement 49, so that when both segments 51 are in place the stem sections will be substantially fully enclosed. The outer surface of segment 51 is made substantially flat to complement the shape of inner surface 30 of the related seat member. A pair of coil springs 53 is arranged on opposite sides of upper stem portion 47 between the segments 51, as best seen in FIG. 7, being seated in recesses 54 provided in the opposed faces of segments 51. A second pair of coil springs 55 is mounted in transverse openings 56,56 provided in the lower portion of rectangular gate portion 45 on opposite sides of the center of opening 46, as best seen in FIGS. 8 and 11. The springs 55 are arranged in compression between the lower end portions of segments 51. Springs 53 and 55 function to bias the closure segments 51 toward the inner surfaces 30 of the related seat members, so as to maintain a close sliding fit between the segments and the seat surfaces. The outer faces of segments 51 extending above openings 52 form the closure portion of the closure assembly which when in the position illustrated in FIG. 1, will serve to close off the flow way through the valve. When the gate assembly is raised in the usual manner to a position aligning openings 46,52 with flow ports 12,12, the closure member will be in the flow way opening position.

Lower stem section 48 is slidably received in stuffing box 24 for reciprocal movement therein in response to reciprocal movement of the closure assembly, and packing 25 serves to slidably seal about lower stem section 48. Upper stem section 47 is provided with an externally threaded portion 60 and extends through stuffing box 17 wherein packing 18 serves to slidably seal about the stem section. An internally threaded drive nut 61 extends into cap 20 and is internally threaded at 62 for threaded engagement with threads 60, whereby rotation of nut 61 will serve to raise and lower the stem and closure assembly in accordance with the direction of rotation of the nut, in order to move the closure assembly between flow way opening and flow way closing positions. The lower end of nut 61 carries an annular flange 63 which supports upper and lower antifriction bearings 64 and 65, respectively. The upper portion of nut 61, which projects above cap 20, is provided with conventional flats 66 for mounting of an operating wheel 57 or other conventional operator, by which the closure assembly is actuated. A tubular cap 68, having openings 69 in the walls thereof, is mounted to the upper end of nut 61. Openings 69 in upper cap 68 and openings 28 in lower cap 27 serve to expose the outer ends of upper and lower stem sections 47 and 48 to ambient atmospheric pressures, and by making stem sections 47 and 48 identical in cross section, the stem will be fully balanced insofar as external pressures are concerned.

Returning now to the sealant systems connected with the reservoirs 32 and 33, it will be seen that the lower end of reservoir 32 communicates through a longitudinal passage 70 with a passage 71 which extends transversely through the body of seat member S to the inner and outer surfaces thereof. The outer end of transverse passage 71 communicates with an annular sealant groove 72 formed in outer surface 31 of the seat member encircling opening 40 and the related flow port. The inner end of passage 71 communicates with the exterior of inner face 30 of the seat member and is spaced from an annular sealant groove 73 formed in inner surface 30 encircling opening 40. The upper portion of closure segment 51 is provided on its outer face with a jumper recess 74 adapted to communicate sealant groove 73 with the inner end of passage 71 when the closure assembly and segment 51 is in the flow way closing position, as seen in FIG. 1. It will be understood that when the closure assembly is moved upwardly to the flow way opening position, the corresponding displacement of recess 74 will serve to disconnect groove 73 from passage 71.

As best seen in FIG. 2, a threaded socket 75 is formed in the side of body 10 and is adapted to receive a conventional pressure fitting 76 for introducing sealant material into socket 75, the bottom of which communicates through a passage 77 with the interior of chamber 11 at a point which will be in registration with sealant groove 72. With this arrangement, it will be seen that sealant introduced through fitting 76 will be forced via passage 77 through groove 72, thence via passages 71 and 70 into the interior of reservoir 32 below barrier 36. Sealant groove 72 also communicates at a point spaced from transverse passage 71, generally on the opposite side of opening 40, with a passage 78 which leads into a vertical passage 79 which communicates with the inner end of reservoir 33 above barrier 39. Thus, it will be seen that introduction of sealant through fitting 76 will not only serve to fill reservoir 32, but also to simultaneously fill reservoir 33. Outer face 31 of the seat member is also provided with a pair of annular grooves 79 and 80 on opposite sides of sealant groove 72 substantially concentric therewith and also encircling opening 40. O-ring seals or other suitable packings 81 and 82, respectively, are mounted in grooves 79 and 80 to seal between outer surface 31 of the seat member and the surrounding portion of the wall of chamber 11 on opposite sides of groove 72.

In operation, it will be seen that when the closure assembly is moved to the flow way closing position, shown in FIG. 1, the differential line pressure across the closed valve will act on the downstream reservoirs, the differential line pressure being exerted against both barriers 36 and 39 urging them inwardly of the respective reservoirs and simultaneously forcing sealant from both reservoirs into sealant groove 72 to seal off between outer surface 31 of the gate member and the surrounding wall of chamber 11 and sealant from upper reservoir 32 will be simultaneously forced through passage 71 and jumper recess 74 into sealant groove 73 provided in the inner surface of the seat member to seal about opening 40 between the seat member and the related closure segment 51. Thus, sealant seals will automatically be provided between both surfaces of the seat member and the related portions of closure segment 51 and the wall of chamber 11. The sealing action will be simultaneous. The O-ring seals 81 and 82 will likewise seal off on opposite sides of groove 72 and will be effective to prevent loss of sealant from groove 72, irrespective of the direction of any pressure differentials across the sealant groove. This is a highly useful arrangement, since it permits effective sealing of the exterior of the seat member while assuring against loss of sealant due to any misalignment between the parts or, as indicated previously, irrespective of the direction of any pressure differential across the sealant groove. By providing the two reservoirs in each seat member, connected as described, they will supplement one another in assuring an adequate supply of sealant to both sealant grooves in response to line pressure differentials.

While the seat construction and closure assembly of the illustrative embodiment contemplates a flat-sided gate construction, it will be understood that the particular form of the gate assembly may be modified, provided, of course, the inner surfaces of the seat members are shaped to complement the shape of the closure. Similarly, the shape of the wall of chamber 11 may be varied from the cylindrical shape of the illustrative embodiment, as for example, a rectangular shape; provided, again that the outer surfaces of the seat members conform thereto.

It will be evident that in the valve construction, as described herein, a very minimum of machining will be required to form the closure chamber and the other major portions of the valve while the construction of the seat members embody substantially all of the machining that will be required.

In assembling the structure, it will be evident that with the closure assembly removed, each seat member may be introduced into chamber 11 through the opened upper end and then guided laterally in position against the chamber wall, the lower end being guided by the cooperation between slot 37 and dowel pin 38 and the upper end by the introduction of shoulder 41 into recess 42. With both seat members thus in place the closure assembly can be inserted into the valve between the seat members and the bonnet and the closure actuating elements installed. Similarly, the lower stem section 48 will simultaneously be inserted through stuffing box 34 and effectively sealed with packing 25 and gland 26.

It will be understood that various other alterations and modifications may be made in the details of the illustrative embodiment within the scope of the appended claims but without departing from the spirit of this invention.

It is claimed:

1. An automatic sealant sealed valve, comprising:
   a. a housing having a closure chamber therein defined by a substantially smooth cylindrical wall;
   b. coaxial upstream and downstream flow ports defining a flow way intersecting said chamber;
   c. a closure member having a flow passage therethrough disposed in said chamber for movement between positions opening and closing said flow way;
   d. upstream and downstream seat members slidably insertible into said chamber on opposite sides of said closure member and having transverse openings therethrough registering with the respective flow ports;
   e. each of said seat members comprising an elongate body having an integral inner surface carrying a sealing area shaped for sealing engagement with said closure member and an integral outer surface defining a cylindrical segment in cross section generally complementary in shape to the adjacent wall surface of said chamber;
   f. an automatic sealing arrangement including:
      i. sealant reservoir means confined within each of said seat members;
      ii. sealant conduit means communicating said reservoir means and said sealing area;
      iii. each of said seat members having an annular sealant groove in the outer surface thereof disposed about said opening;
      iv. conduit means communicating said reservoir means with said groove;
      v. movable barrier means in said reservoir means operable in response to line pressure when said closure member is in the flow way closing position to force sealant through both said conduits to said sealing area and to said groove; and
      vi. a pair of annular seal elements substantially concentric with said groove disposed on opposite sides thereof to seal between the outer surface of said seat member and the wall of said chamber about the related flow port.

2. An automatic sealant sealed valve according to claim 1, wherein said sealant reservoir means includes two sealant reservoirs confined within each of said seat members on opposite sides of said transverse opening and in communication with both said conduit means.

3. An automatic sealant sealed valve according to claim 1, wherein said sealing area includes an annular groove disposed to encircle the adjacent flow port and spaced from said first conduit, and a jumper recess in the adjacent face of said closure member disposed to communicate said annular groove with said first conduit when the closure member is in the flow way closing position.

4. An automatic sealant sealed valve according to claim 1, wherein said annular seal elements comprise resilient O-rings.

5. An automatic sealant sealed valve according to claim 1, wherein said closure member comprises a flat-sided, generally rectangular, through-conduit type gate assembly.

6. An automatic sealant sealed valve according to claim 1, including cooperating pin-and-slot alignment means arranged between each seat member and a wall of said chamber for positioning the seat member in the chamber with said transverse opening in registration with the related flow port.

7. An automatic sealant sealed valve according to claim 1, wherein said closure member comprises:
 a. a generally rectangular flat-sided body having a through-conduit opening therethrough;
 b. coaxial cylindrical stem sections of substantially identical cross section arranged to extend from opposite ends of said body through opposite ends of said housing;
 c. substantially flat generally rectangular closure segments positioned against the opposite side faces of said body and having openings therethrough registering with said through-conduit opening; and
 d. spring means mounted between the segments to bias them outwardly of the body toward the related inner faces of said seat members.

8. An automatic sealant sealed valve according to claim 1, including sealant inlet means mounted on said housing, and passage means communicating said sealant inlet means with said sealant groove to thereby introduce sealant through said second conduit means to said reservoir means.

9. An automatic sealant sealed valve according to claim 1 wherein both said conduit means include a portion in common.